Figures 1, 14:
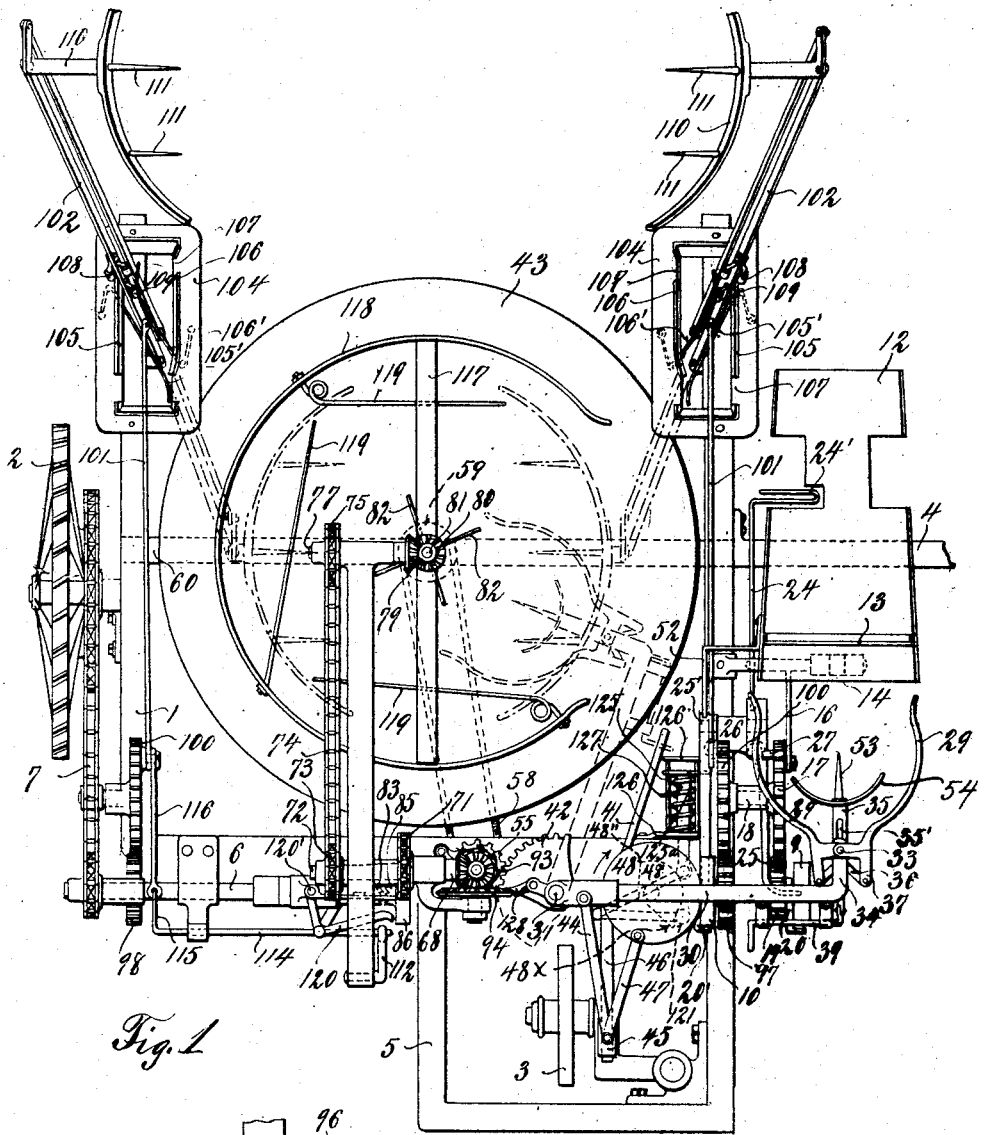

C. W. LEVINE.
GRAIN SHOCKER.
APPLICATION FILED NOV. 26, 1910.

1,033,023.

Patented July 16, 1912.
4 SHEETS—SHEET 1.

Witnesses

Inventor
C. W. Levine

Attorneys

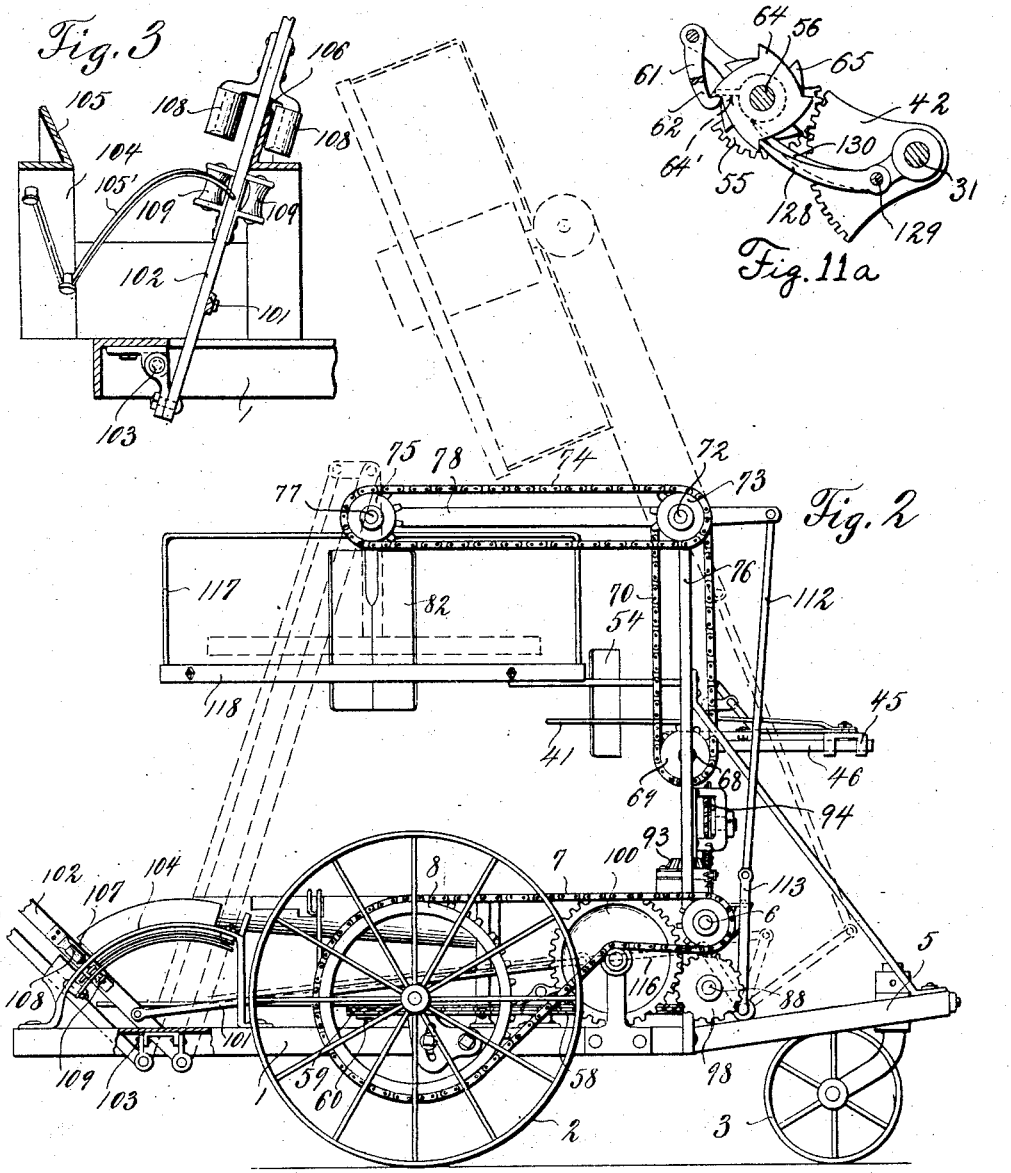

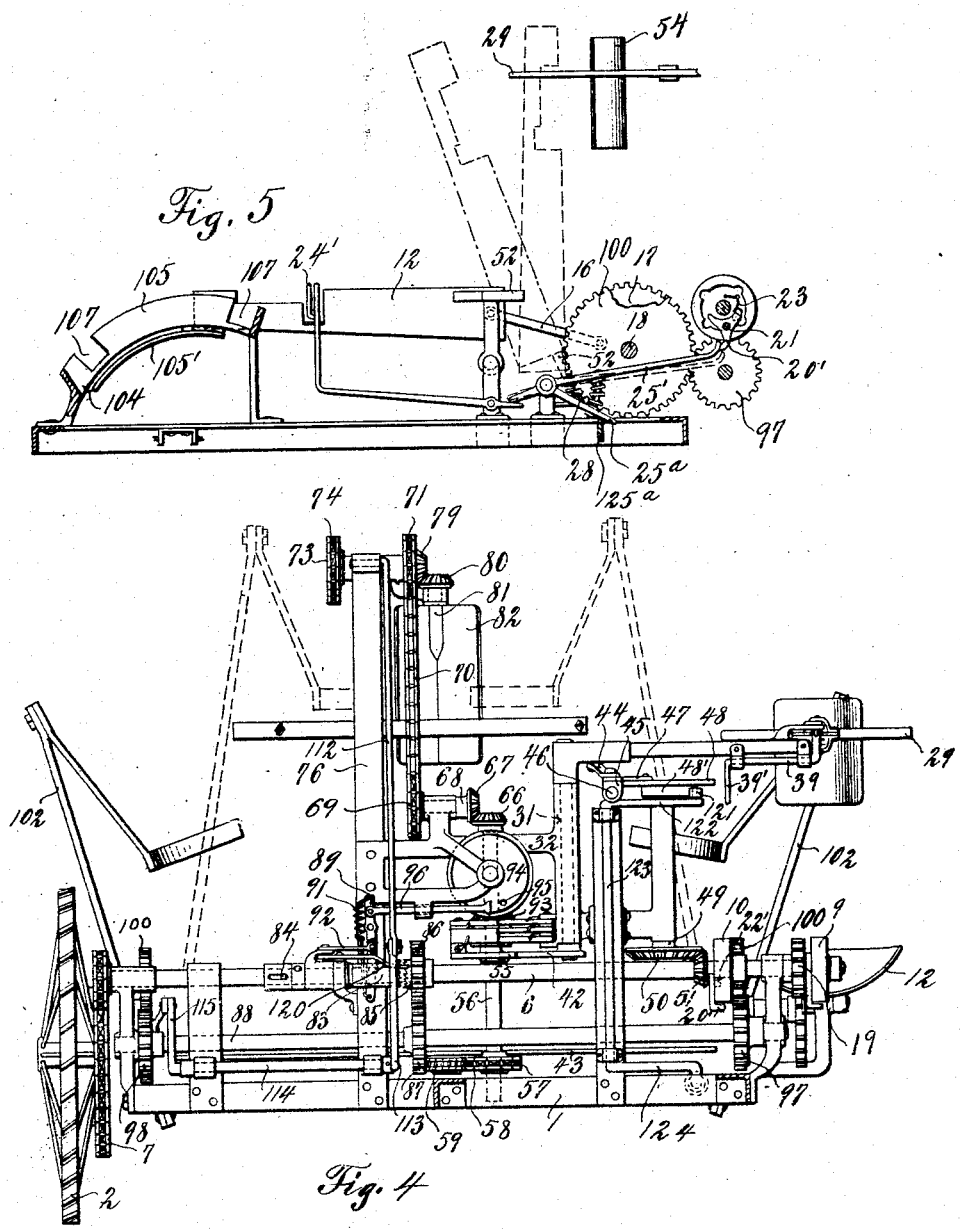

C. W. LEVINE.
GRAIN SHOCKER.
APPLICATION FILED NOV. 26, 1910.
1,033,023.
Patented July 16, 1912.
4 SHEETS—SHEET 4.
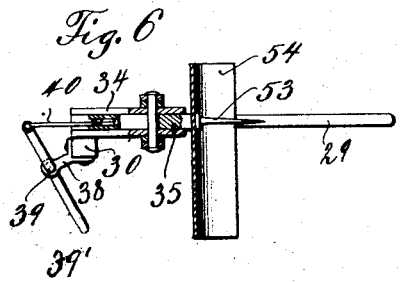
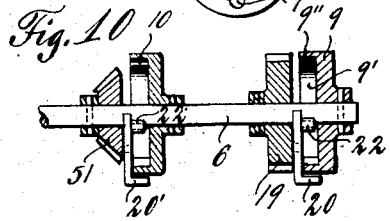
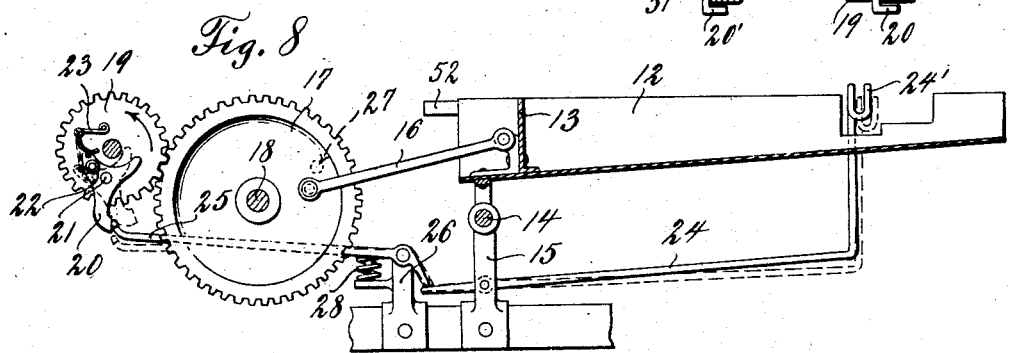
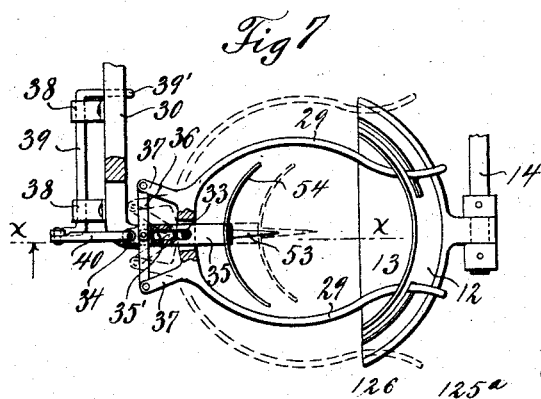
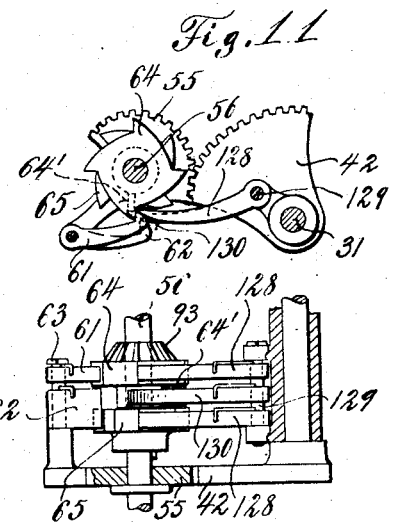
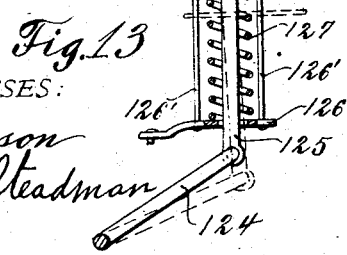
WITNESSES:
E. Larson
Mae Steadman
INVENTOR
C. W. Levine
BY Cobb
Attorneys

UNITED STATES PATENT OFFICE.

CHARLES WARNER LEVINE, OF ROCKFORD, ILLINOIS.

GRAIN-SHOCKER.

1,033,023.  Specification of Letters Patent.  Patented July 16, 1912.

Application filed November 26, 1910. Serial No. 594,382.

*To all whom it may concern:*

Be it known that I, CHARLES WARNER LEVINE, citizen of the United States, residing at Rockford, in the county of Winnebago, and State of Illinois, have invented certain new and useful Improvements in Grain-Shockers, of which the following is a specification.

The present invention involves improvements in that class of agricultural machines ordinarily called grain shockers, the object of the invention being to design a machine of this type capable of taking bundles of grain from a binder, or the like, transferring said bundles in upright positions to a shock supporting platform, accurately positioning the several bundles to provide shocks of uniform size, and finally forcibly removing the formed shock from the platform and depositing the same upon the ground.

Associated mechanisms are employed to perform the several functions hereinbefore referred to and the invention resides in the special coöperation of said mechanisms and other separate peculiar constructions.

For a full understanding of the present invention, reference is to be had to the following description and to the accompanying drawings, in which—

Figure 1 is a top plan view of a machine embodying the essential features of the invention; Fig. 2 is a side elevation; Fig. 3 is a detail fragmentary sectional view of the guides co-acting with the shock carrying levers to properly direct their movement forwardly and rearwardly in engaging with and disengaging from, respectively, the formed shock; Fig. 4 is a front elevation of the machine with the front portion of the frame cut away; Fig. 5 is a partial side elevation and sectional view showing more clearly the range of movement of the bundle receiver; Fig. 6 is a detail sectional view taken about on the line x—x of Fig. 7; Fig. 7 is a plan view of the bundle carrier, certain parts being shown in section; Fig. 8 is a longitudinal sectional view of the bundle receiver, bringing out more clearly the trip mechanism coöperating with the gear carrying the clutch dog; Fig. 9 is a view of one of the clutch members; Fig. 10 is a sectional view showing the relative arrangement of the clutch members and co- acting gears carried by the driving shaft; Fig. 11 is a detail view of the ratchet mechanism for operating the bundle positioner parts, arranged in one position; Fig. 11ª is a view similar to Fig. 11, showing the parts of the ratchet mechanism in a different position; Fig. 12 is an elevation of the ratchet mechanism illustrated in Fig. 11. Fig. 13 is a detail view bringing out more clearly the mounting of the spring actuated rod and shifting arm carried thereby; and Fig. 14 is a fragmentary view showing more clearly the clutch mechanism.

A grain shocking machine constructed in accordance with this invention comprises a suitable horizontal frame 1, supported at one side by the ground wheel 2, and at its front portion by a caster wheel 3. At the other side of the machine is a horizontal bracket or arm 4 adapted to support another wheel in a detachable manner. The frame 1 is provided with a frame extension 5 at its front end which may be attached by any substantial means to the side of a binder. Mounted upon the front portion of the frame 1 is a transverse drive shaft 6 operated by means of a suitable endless chain 7 connecting one end of the shaft with a suitable drive sprocket or wheel 8 rotatable with the ground wheel 2. Near the end of the drive shaft 6, remote from the wheel 2, are carried clutch members 9 and 10, the member 9 being pinned or otherwise fastened for rotation with the shaft 6, and the member 10 being of a form similar to the member 9. At the side of the frame 1 opposite the wheel 2 is arranged a bundle receiver 12 consisting of an elongated concavo-convex body arranged in a horizontal position normally and adapted to receive therein bundles delivered successively thereto from the binder or other machine. The receiver 12 has an end plate 13 for the butt of the bundle to rest upon when the receiver is raised to an approximately vertical position in the manner shown in dotted lines in Fig. 5, and by means now to be described. The receiver 12 is pivoted, as shown at 14, to a bracket 15 secured to the adjacent side of the frame 1 and projecting forwardly from the front end o fthe receiver is an arm 16 which is connected pivotally with the operating gear 17 carried by a short shaft 18 mounted in a suitable bearing on the frame 1. The operating gear is in mesh with a drive gear 19 loosely mounted on the shaft 6 and slightly spaced from the clutch member 9. The gear 19 carries a clutch dog 20 pivoted thereto at 21, as shown in Fig. 8, said dog having a roller 22 journaled thereon which roller extends into a hollow side portion 9' of the clutch member 9. The periphery of the hollow portion of the member 9 has a plurality of notches 9'', shown in Fig. 9, and in which notches the roller 22 is adapted to interlock under certain conditions. Normally, however, the dog 20 is held in a position wherein the roller 22 is spaced from the notches 9'', by the lever 25, a spring 23 tending to force the roller 22 outwardly toward the notched peripheral portion of the member 9.

Associated with the receiver 12 is a trip rod 24 pivoted to the bracket 15, said trip rod having a lateral arm 24' extending transversely to the receiver 12 and projecting just above the body of the receiver so that a bundle deposited upon the receiver will strike the arm 24' of the trip rod 24, imparting pivotal movement thereto. The above actuation of the trip rod 24 causes it to operate the lever 25 aforesaid, pivoted to a casting 26 on the frame 1, the free end of the lever 25 being thus thrown downwardly releasing the dog 20 and permitting the spring 23 to throw the dog into a position in which its roller interlocks in one of the notches 9'' with the clutch member 9 and causes rotation of the gear which transmits movement simultaneously to the operating gear 17 with which it meshes. The latter being connected with the arm 16, the receiver 12 is now raised by the rotative movement of the gear 17 which forces the outer end of the arm 16 downwardly. When the gear 17 has made about one-quarter revolution, a pin 27 projecting from the inner side of the gear 17 is caused to engage the free end portion of the lever 25, depressing the same out of the path of movement of the outer end of the clutch dog 20 as the latter rotates with the drive gear 19. As soon as the gear 17 has rotated its second quarter revolution the pin 27 begins to move upwardly and shortly afterward moves out of contact with the upper side of the lever 25, permitting a spring 28 co-acting with the lever to return the latter to its normal position shown in full lines in Fig. 8, in which position it is in the path of movement of the dog 20 so that as said dog reaches the end of its second revolution it is stopped and moved pivotally by engagement with the part 25, the roller 22 being thus disengaged from the notched portion of the member 9, the rotation of the gear 19 being thus immediately stopped. Meanwhile the receiver 12 has been returned to its horizontal position by the full rotation of the gear 17 and said receiver is now ready to receive its second bundle.

When the receiver 12 was raised to its approximately vertical position during the operation previously described, the bundle momentarily rested upon the end plate 13 of the receiver and was forced between the grabbing arms 29 of a carrier 30. The carrier 30 comprises the arms 29 aforesaid and a horizontal supporting arm projecting laterally from the upper end of a shaft 31 mounted in a suitable vertical bearing provided in a bracket or casting 32 above the frame 1. The arms 29 are pivoted at 33 to a rearward extension 34 of the carrier 30 and a slide 35 is mounted on the said extension and is slotted at 35' to receive the pivotal fastening 33 by which it is guided in its movement on the extension 34. A toggle lever 36 is used to connect short projections 37 on the front ends of the grabbing arms 29 and the members of said toggle lever at their point of pivotal connection are connected to the slide 35. On the carrier 30 are bearings 38 in which a short crank shaft 39 is mounted, the outer arm of said shaft being connected by a link 40 with the slide 35, and the inner arm of said shaft projecting downwardly, as shown at 39' so that the stationary horizontal bar 41 is in the path of movement. The shaft 31 supporting the carrier 30 has a toothed segment 42 on its lower end and said carrier is moved back and forth from a point in front of the receiver 12 to a point adjacent the middle portion of a shock supporting platform 43, the range of movement of the carrier 30 being illustrated by dotted and full line positions thereof, as shown in Fig. 1. The carrier 30 is intermittently operated by means of a link 44 pivotally connected at one end to the carrier 30 and pivotally connected at its opposite end to a sliding block 45, mounted for movement upon a horizontal guide 46, the latter constituting an extension of a part of the frame structure of the machine. The block 45 is operated back and forth at properly timed intervals by means of a second link 47 connecting same with a horizontal wheel 48 mounted on the upper end of a vertical shaft 49 for rotation therewith, the lower end of the shaft 49 carrying the bevel gear 50 meshing with the bevel gear 51 loosely mounted on the main drive shaft 6. The bevel gear 51 carries a second clutch dog 20' substantially the same in form as the clutch dog 20 hereinbefore referred to, the receiver being provided with a tripping arm 52 extending laterally and forwardly for the same coöperation with the dog 20' as that between the trip rod 24 and the dog 20. Thus when the receiver reaches a predetermined point in its upward movement, the trip arm 52 will be lowered and engages the rear end of an auxiliary lever 25', equivalent to the lever 25, moving said lever 25' out of engagement with respect to the dog 20', releasing the latter so that its spring forces its roller 22' into a notch in the clutch member 10, whereupon the bevel gear 51 will be rotated thereby rotating the shaft 49 and causing the carrier 30 to be moved from its normal position in front of the receiver, through the medium of the links 44 and 47 and the wheel 48. While the bevel gear 51 is thus being rotated with the drive shaft 6 temporarily in the above manner, the carrier 30 is moved toward the center of the platform 43 and back to its original position. As the carrier with its arms 29 embracing the bundle, moves toward the center of the platform, the crank arm 39' of the shaft 39 engages the bar 41 and is partially rotated thereby. This rotation causes movement of the slide 35 toward the outer extremity of the extension 34 of the carrier, breaking the joint of the toggle lever, as shown in dotted lines in Fig. 7, thereby causing separating movement of the arms 29, permitting the latter to release the bundle embraced thereby.

The slide 35 carries at its outermost end a bundle piercing tooth 53 and a shoving plate 54, said parts being forced outwardly toward the center of the platform with the rotation of the shaft 39. While the carrier 30 is in its normal position shown in Fig. 1, when the bundle is raised into a vertical position by the receiver 12, and is pushed into the space between the arms 29, the tooth 53 engages with the bundle and the pressure of the bundle forwardly against the plate 54 forces the slide 35 forwardly on the extension 34 and straightens the toggle lever 36, which latter moves the grabbing arms 29 toward each other into close engagement with the opposite sides of the bundle. The engagement of the arms 29 is with sufficient pressure to hold the bundle tightly as the carrier 30 transfers the same from in front of the receiver to a point adjacent the middle of the platform 43. The teeth 53 assists in preventing the bundle from dropping or slipping downwardly from the embrace of the arms 29.

The segment 42, moved with and carried by the lower end of the shaft 31, is in mesh with a segmental gear 55, the latter being loosely mounted upon a vertical shaft 56 on the lower end of which is a sprocket gear 57, connected by a sprocket chain 58 with a sprocket gear 59 on the axis of the platform 43. The platform 43 is rotatable with its axis, the latter being mounted in a bearing in a cross bar 60 which connects the sides of the frame 1. Every time the carrier 30 is moved toward and from the center of the platform 43, the shaft 31 supporting same is given about a quarter revolution turning the segment 42 correspondingly and also the gear 55. The gear 55 has pawls 61 and 62 pivoted thereto at 63, said pawls engaging ratchet wheels 64 and 65, respectively, the latter of which is keyed or otherwise secured to the shaft 56 while the former is loose upon the shaft. Every time the loose gear 55 is partly rotated by the segment 42, the pawls 61 and 62 which are of hook like form impart to the shaft 56 a part rotation and similar movement is thus imparted to the platform 43 through the sprocket chain connection 58 aforesaid.

At the upper end of the shaft 56 is a bevel gear 66 meshing with a similar gear 67 on one end of a short horizontal shaft 68, the other end of said shaft 68 carrying a sprocket gear 69 connected by a sprocket chain 70 with a second sprocket gear 71 on a horizontal shaft 72. The shaft 72 has the sprocket gear 71 on one end and on its other end is a sprocket gear 73 connected by a horizontal sprocket chain 74, with the sprocket gear 75, said shaft 72 being mounted in a suitable bearing at the upper end of a vertical standard 76 projecting upwardly from the front end portion of the frame 1. By the several gears just referred to, the vertical chain 70 and the horizontal chain 74, motion is transmitted from the shaft 56, as it is intermittently actuated, to a shaft 77 mounted in a suitable bearing on the outer end of a horizontal arm 78 projecting rearwardly from the standard 76. The shaft 77 has a bevel gear 79 on one end meshing with a bevel gear 80 carried by the upper end of a vertical shaft 81, the latter having radially extending wings 82, preferably four in number. The shaft 81, with the wings 82, constitutes the bundle positioner and said parts are arranged some distance above the platform 43, as shown most clearly in Figs. 2 and 4. The bundle positioner is designed to form stop means to engage the upper end portion of each bundle as it is transferred from the receiver to the platform by means of the carrier 30. The wings 82 of the positioner provide angular seats into which the upper ends of the bundles are shoved when the bundles are brought over the center of the platform 43 successively by the carrier 30. It is to be borne in mind that the platform 43 is intermittently rotated with a movement corresponding to the movement of the positioner, both of these parts being driven from the same shaft 56, as hereinbefore described.

Mounted on the main drive shaft 6 near the standard 76 is a sliding toothed clutch member 83, having a pin and slot connection 84 with the shaft, permitting the member 83 to be moved toward and from the toothed clutch element 85 of a spur gear 86 loosely mounted on the shaft 6, said gear being in mesh with another spur gear 87, the latter being keyed or otherwise secured to a shaft 88 arranged below and parallel with respect to the drive shaft 6. The clutch member 83 is peculiarly operated by means of a toggle lever 89. The lever 89 comprises an upper member pivoted between its ends at 90 to the standard 76 and a coiled spring 91 is connected with the upper end of the upper member of the lever. The pivotal connection between the upper and lower members of the toggle lever 89 affords a pivotal connection between said lever and a plate 92, the latter being also connected with the clutch member 83. Meshing with the bevel gear teeth 93 at the upper end of the ratchet wheel 64 is a vertical bevel gear 94 having a projection 95 adapted to strike a shifting rod 96 slidable on a bracket extending laterally from the standard 76 to support the gear 94. As the gear 94 is intermittently revolved, its movement being properly timed with relation to the movement of other mechanisms of the machine, the projection 95 will strike the adjacent end of the shifting rod 96. Said shifting rod is connected pivotally with the uppermost member of the toggle lever 89 and throws said member outwardly at its upper end, causing the toggle lever to break joint by movement to the right, as the parts are seen in Fig. 4. Such movement of the toggle lever, through the plate 92, pulls the clutch member 83 into engagement with the clutch member 85 of the gear 86 whereupon the motion of the drive shaft 6 is imparted to said gear 86 and thence to the gear 87 turning the shaft 88. On the shaft 88, near its opposite ends, are mounted the gears 97 and 98. The gears 97 and 98 are in mesh with larger gears 100. The gears 100 are pivotally connected with rods 101, said rods in turn being connected with the intermediate portions of shock lifting and depositing levers 102, the levers 102 being preferably comprised of parallel bars in spaced relation and said levers are pivotally mounted upon the frame 1, the points of pivotal connection being denoted at 103. The levers 102 pass upwardly from their points of pivotal support between the sides of rectangular guides 104. One of the guides 104 is mounted on each side of the frame 1, at its rear end, and each guide is formed with an outer longitudinal flange 105 and a similar guide flange 106. The flanges 105 and 106 are cut away or interrupted near their opposite terminals, to form clearance spaces 107. Each lever 102 has mounted thereon hangers supporting a pair of rollers 108 in spaced relation, said rollers being adapted to receive either one of the flanges 105 and 106 therebetween, and to travel along said flanges when pivotal movement is imparted to the levers 102 by the actuation of the rods 101 when the gears 100 are rotated. On the under side of each guide 104 and at opposite sides of the rectangular opening in the body of the guide are mounted angle shaped springs 105' and 106', said springs being attached to the guides at one end and having their other ends arranged to bear against rollers 109 secured to opposite sides of the adjacent lever 102. The levers 102 each carry a shock engaging device 110, consisting of a curved plate or bar and off-standing teeth 111, extending therefrom, the bars 110 of the two levers 102 curving in opposite directions.

When the clutch members 83 and 85 are operably connected at a predetermined time in the operation of the machine, motion is transmitted from the shaft 6 to the shaft 88 through gear 87. The gears 97 and 98 rotate with the shaft 88 and cause revolution of the gears 100. As the gears 100 start to revolve, they pull the rods 101 forwardly, imparting similar movement to the levers 102. The levers 102 are normally in the positions shown in Fig. 1, namely, at the rear limit of their movement of the guides 104. Under these conditions the springs 106' are bearing against the levers 102 to hold their rollers in engagement with the rear ends of the outer flanges 105 of the guides 104. Said rollers 108 operate freely in contact with the guide flanges 105 as the levers 102 are pulled forwardly in their shock engaging operation. As the levers 102 move forwardly, they engage with and place under tension the free arms of the outer springs 105' and just as the levers reach the forward limit of their movement, the rollers 108 reach the clearance spaces at the front ends of the outer flanges 105, whereupon the springs 105' promptly throw the levers laterally toward each other, and toward the center of the platform 43 until the levers abut with the guide flanges 106 at the opposite sides of the guides 104. In this operation the rollers 108 are now in the clearance spaces at the front ends of the flanges 106 and just at this time, the shock has been engaged by the shock engaging devices 110 of the levers and the gears 100 are on the return half of their complete revolution. During this final half of revolution of the gears 100, the rods 101 are forced rearwardly, the rollers this time operating longitudinally of the guide flanges 106 as the levers 102 are forced rearwardly to effect delivery of the shock from the platform 43 to the ground. When the levers 102 reach their rear limit of movement, the rollers 108 are opposite the rear clearance spaces of the flanges 106, and the springs 106' force the levers outwardly until they rest in the positions in which they were arranged previous to being moved forwardly. After the shock engaging devices 110 have engaged the shock in the above operation, as the levers 102 move rearwardly to deliver the shock, they leave the latter slightly previous to depositing the same upon the ground, the function of the springs 106' being dual to the extent that they not only force the levers 102 into coöperation with the outermost flanges of the guides 104, but this movement of the levers disengages the teeth 111 from the shock, freeing the shock delivery mechanism therefrom.

It will be evident that before the shock may be delivered from the platform 43, the bundle positioner comprising the wings 82, must be disengaged from the shock so as not to interfere with the movement of the latter by the levers 102. For the above purpose the horizontal arm 78 which carries the parts 75, 77, 79, 81 and 82, is pivoted to the upper end of the standard 76 and the forward end of the arm 78 projects beyond the standard 76 to a point of connection with the approximately vertical pull rod 112, the lower end of which is attached to a crank arm 113 on a double crank shaft 114 supported by suitable bearings adjacent to the shaft 88. The shaft 114 has its second crank 115 connected by a rod 116 with the adjacent gear 100. Thus as the gear 100 connected with the rod 116, makes the first half of its revolution, when actuated, the crank shaft 114 is partly rotated so as to cause outward movement of the crank arm 113, as shown in dotted lines in Fig. 2, thus pulling downwardly on the rod 112 and raising the arm 78 with the bundle positioner sufficiently high to disengage the bundle positioner from the upper end of the formed shock. At its outer end, the arm 78 carries a pendant U-shaped frame 117 which supports a somewhat circular shaped shock supporter 118 arranged horizontally and having a plurality of spring pressure members 119 secured thereto.

The carrier 30 in transferring the bundles from the receiver to the platform forces the first four bundles of a shock into the angular seats provided by the bundle positioning wings 82, said seats being presented successively to the side from which the carrier delivers each bundle, by the means hereinbefore described. The bundles are pressed or held in place by means of the pressure members 119 carried by the circular supporter and former 118 in a manner which will be readily apparent, the parts 119 yielding to accommodate bundles of slightly different sizes.

When the crank arm 113 of the shaft 114 is returned to its normal vertical position by the gear 100 to which it is connected, it strikes the forward arm of a bell crank lever 120, causing the rear arm of said lever, which is connected to the clutch member 83, as shown at 120', to be thrown to the left as seen in Fig. 1, thereby disengaging said clutch member from the clutch element 85. This disengagement of the clutch parts 83 and 85 is effected just as the gears 100 complete a single revolution and hence the levers 102 are stopped, after one operation of delivering a shock to the ground, in the positions shown in Fig. 1, for necessarily, the movement of the shaft 88 and associated gears is discontinued immediately the clutch parts 83 and 85 are separated.

The wheel 48 before described, is provided on its under side with a cam 48', shown in dotted lines in Fig. 1, and also seen in Fig. 4, said cam having a roller 121 operating in contact with the same, the roller being carried by the upper horizontal crank arm 122 of a shaft 123 mounted in suitable bearings upon the frame work of the machine. The shaft 123 has also crank arm 124 connected to a short rod 125 slidable between guide rods 126' secured to the frame 1, and coiled spring 127 normally tending to force the rod 125 rearwardly.

The rod 125 has sliding movement imparted thereto, as the cam 48' is rotated in contact with the roller 121, and said rod carries at its rear end a guiding and tripping arm 125ª having openings through which the guide rods 126' pass. The arm 125ª moves with the rod 125, and the rods 126' are carried by suitable brackets 126, the front one of which has a slot through which the part 125 passes. The trip 52 first imparts a downward movement to the arm 125ª, as the bundle receiver is elevated. This action permits the dog 20' to connect the shaft for operation, this starting the movement of the carrier. The cam 48' is now in motion and as the roller 121 passes over the blunt point 48" of the cam 48', the arm 125ª will allow a downward movement of the lever 25', the spring 127 being at this time expanded to its full extent. The delivery and return movement of the carrier 30 is thus effected because the clutch dog 20' makes a second revolution without interference from the lever 25'. In other words, by the above coöperation of parts the dog 20' is permitted to pass the lever 25' during the first revolution of the part 10, because of the previous depression of the lever 25' by the tripping arm 125ª. Subsequently to the above operation, the roller 121 moves around the point 48ˣ of the cam 48', again compressing the spring 127, causing the tripping arm 125ª to be moved forwardly, whereupon the lever 25' moves upwardly into the path of movement of the dog 20', during the second revolution of the latter engaging same and thereby disconnecting the parts 51 and 10.

Describing more clearly the mechanism whereby the bundle positioner and platform are operated intermittently, it will be recalled that the ratchet wheel 65 is keyed on the shaft 56, while the ratchet wheel 64 and the part 55 are loosely mounted on said shaft. As the carrier 30 transfers the first bundle to the platform 43, the controlling pawl 130 is in the position shown in dotted lines in Fig. 11, thus preventing the hook pawl 62 from catching the tooth adjacent to which the end of the pawl 130 is arranged. Since the ratchet wheel 65 has eight teeth, however, the hook pawl 62 will catch one of the said teeth, imparting an eighth revolution to the member 65 and also to the bundle positioner and platform which are operated from the shaft 56, arranging the latter member to receive said first bundle. On the second movement of the carrier, the lug 64' of the ratchet wheel 64, having been previously rotated a quarter revolution with the wheel 64, under the actuation of the pawl 61, disengages from the end of the controlling pawl 130, permitting said pawl to move inwardly against the hub of wheel 64 into the full line position shown in Fig. 11. The last mentioned position of the controlling pawl 130 permits the pawl 62 to move over two of the teeth of the wheel 65, engaging the second tooth without interference of the pawl 130, so that in the second movement of the carrier, transferring the second bundle to the platform 43, the parts 55 and 62 will have rotated the shaft 56 a quarter revolution. Three successive quarter revolutions of the shaft 56 follow the eighth revolution of said shaft, and then the lug 64' is brought into a position again forcing the controlling pawl 130 outwardly so that on the fifth movement of the carrier 30 only a quarter revolution will have previously been imparted to the shaft 56 and thus the fifth bundle transferred by the carrier 30 will be placed between the first and fourth bundles delivered by the carrier to the platform. The above operation continues in the placing of the bundles on the platform by the carrier.

On the shaft 31 are mounted pawls 128 arranged above and below the pawl 130 and coöperate with the ratchet wheels 64 and 65 and also with said pawls 61 and 62 to control engagement of the latter with respect to the ratchet wheels. A pivot 129 connects the pawls with a bushing on the shaft.

Briefly describing the entire operation of the machine, it is to be noted that the bundles are fed successively to the receiver 12 and dropped thereon in horizontal positions.

The receiver is subsequently raised into a vertical position until the bundle stands upright. The receiver thus delivers the bundle to the grabbing arms 29 of the carrier 30, whereupon the receiver moves downwardly to its normal position and the carrier moves laterally in a pivotal manner to transfer the bundle on to the platform 43. Eight bundles are successively placed on the platform 43 and then the delivering mechanism, comprising the levers 102, starts to operate said levers, moving forwardly into engagement with the formed shock. As the levers 102 move forwardly the pivotal positioning means is raised out of engagement with the upper end of the shock, whereupon the latter is engaged by the shock delivery levers which subsequently lift and deposit the shock upon the ground, the movement of the said delivering mechanism being discontinued just as soon as the delivery of the shock is effected.

Having thus described my invention, what is claimed as new is:

1. In a grain shocker, the combination of a normally horizontal bundle receiver pivotally supported at one end, means for raising said bundle receiver into a vertical position comprising a wheel, a connection between said wheel and the pivoted end portion of the bundle receiver, and a controlling device for said raising means consisting of a trip rod having a laterally extending arm above the bundle receiver in the path of movement of a bundle deposited upon said receiver.

2. In a grain shocker, the combination of a frame, a bundle receiver pivoted at one end of said frame and normally in a horizontal position, a bundle carrier comprising a horizontal arm pivotally supported at one end upon the frame, tripping means for tripping the carrier into operation carried by the other end of the carrier arm and arranged to receive a bundle from the receiver when the latter is moved into a vertical position, and means for causing the bundle receiver to assume a vertical position consisting of a wheel, a member connecting said wheel to the pivoted end portion of the receiver, and a trip rod controlling the movement of said wheel and embodying a portion extending over the receiver for depression by a bundle of grain deposited upon the latter.

3. In a grain shocker, the combination of a bundle receiver, a bundle carrier, a shock supporting platform, means for moving the carrier from the receiver to the platform, a bundle positioner normally above and coacting with the platform, and means for simultaneously rotating the bundle positioner and the platform.

4. In a grain shocker, the combination of a bundle receiver, a bundle carrier, a shock supporting platform, means for moving the carrier from the receiver to the platform, a bundle positioner supported above the platform in spaced relation thereto, and mechanism for operating the carrier and simultaneously moving the platform and bundle positioner.

5. In a grain shocker, the combination of a bundle receiver, a bundle carrier, a shock supporting platform, means for moving the carrier from the receiver to the platform, a bundle positioner co-acting with the platform, and mechanism for imparting movement to the carrier and operably connected with the bundle positioner and platform for causing simultaneous movement thereof.

6. In a grain shocker, the combination of a bundle receiver arranged normally in a horizontal position, a shock supporting platform, means for elevating the bundle receiver to effect delivery movement of a bundle thereon, a carrier adapted to receive the bundle from the receiver, means for moving the carrier to the platform to place the bundle thereon, means for rotating the platform, a bundle positioner associated with the platform, delivery means for removing a shock bodily from the platform, and means for moving the bundle positioner out of the way of the delivery means at a predetermined time with respect to the movement thereof.

7. In a grain shocker, the combination of a shock supporting platform, mechanism for placing bundles thereon to form the shock, a bundle positioner for engagement with the shock associated with the platform, shock delivery means movable toward and from the platform, and means for disengaging the bundle positioner from the shock before the delivery means operates on the latter.

8. In a grain shocker, the combination of a shock supporting platform, mechanism for placing bundles thereon to form the shock, a bundle positioner associated with the platform, shock delivery means movable toward and from the platform, means for moving the bundle positioner out of the way of the delivery means at a predetermined time in the operation of the latter, and means for rotating the bundle positioner and platform.

9. In a grain shocker, the combination of a shock supporting platform, mechanism for placing bundles thereon to form the shock, a bundle positioner associated with the platform, shock delivery means movable toward and from the platform, means for moving the bundle positioner out of its normal position before the delivery means engages the shock, and means for simultaneously rotating the bundle positioner and platform.

10. In a grain shocker, the combination of a shock supporting platform, mechanism for placing bundles thereon to form the shock, a bundle positioner associated with the platform, shock delivery means movable toward and from the platform, means for moving the bundle positioner out of the way of the delivery means at a predetermined time in the operation of the latter, and means for actuating the bundle positioner independently of the aforesaid movement.

11. In a grain shocker, the combination of a platform, a bundle positioner associated therewith to support bundles properly on the platform, delivery means for the formed shock comprising spaced levers, shock engaging devices carried by the levers, means for moving the levers forwardly to bring their shock engaging devices on opposite sides of the shock, means for then forcing the levers toward one another to engage the shock engaging devices with the shock, means for returning the levers, means for moving the levers rearwardly to deliver the shock from the platform, and mechanism for moving the bundle positioner out of its normal position previous to the delivering movement of the levers.

12. In a grain shocker, the combination of a platform, a bundle positioner associated therewith to support bundles properly on the platform, delivery means for the formed shock comprising spaced levers, shock engaging devices carried by the levers, means for moving the levers forwardly to bring their shock engaging devices on opposite sides of the shock, means for then forcing the levers toward one another to engage the shock engaging devices with the shock, means for returning the levers, means for moving the levers rearwardly to deliver the shock from the platform, mechanism for moving the bundle positioner out of its normal position previous to the delivery movement of the levers, and a shock supporting member carried by the bundle positioner and movable therewith.

13. In a grain shocker, the combination of means for forming a shock including a shock supporting platform, and delivery means associated therewith comprising a pair of levers, mechanism for moving said levers back and forth to take the shock from the platform and deliver the same to the ground, guides associated with each lever to direct the same in its movement, and means for automatically moving each lever from coöperation with one guide in its movement in one direction, to coöperation with another guide in its movement in the opposite direction.

14. In a grain shocker, the combination of means for forming a shock including a shock supporting platform, and delivery means associated therewith comprising a pair of levers, mechanism for moving said levers back and forth to take the shock from the platform and deliver the same to the ground, guides associated with each lever to direct the same in its movement, and spring means for automatically moving each lever from coöperation with one guide in its movement in one direction, to coöperation with another guide in its movement in the opposite direction.

15. In a grain shocker, the combination of means for forming a shock including a shock supporting platform, shock delivery mechanism comprising a pair of levers having shock engaging members movable back and forth to take a shock from the platform and deliver the same to the ground, guide means coöperating with each lever comprising a frame having spaced guide members, means adapted to connect each lever with one or the other of the guide members of its guide frame, and a spring carried by the guide frame and arranged to disconnect the lever from one of its guide flanges when said lever reaches one limit of its movement and to simultaneously connect it with the other guide flange.

16. In a grain shocker, the combination of means for forming a shock including a shock supporting platform, shock delivery mechanism comprising a pair of levers having shock engaging members movable back and forth to take a shock from the platform and deliver the same to the ground, guide means coöperating with each lever comprising a frame having spaced guide members, spaced rollers adapted to connect each lever with one or the other of the guide members of its guide frame, and a spring carried by the guide frame and arranged to disconnect the lever from one of its guide flanges when said lever reaches one limit of its movement and to simultaneously connect it with the other guide flange, the guide members being interrupted in their length to form clearance spaces permitting the spaced rollers to pass from engagement with one guide member into engagement with the other guide member.

17. In a grain shocker, the combination of a platform, means for placing bundles of grain upon said platform, a bundle positioner arranged above the platform in spaced relation thereto, a pivoted arm, means connecting one end of said pivoted arm with the bundle positioner, means for raising said arm to correspondingly elevate the bundle positioner with respect to the platform, means for delivering the formed shock from the platform after the bundle positioner has been raised, and means for moving the platform and the bundle positioner to cause the shock forming operation thereof.

18. In a grain shocker, the combination of a shock supporting platform, an arm pivoted between its ends and extending at one end over said platform, a bundle positioner supported by said end of the arm and spaced from the platform, means for rotating the platform intermittently, means carried by the arm for imparting movement corresponding to that of the platform to the bundle positioner, means for delivering a formed shock from the platform, and mechanism for simultaneously operating said delivery means and the arm aforesaid to elevate the bundle positioner preliminary to engagement of the delivery means with the shock.

19. In a grain shocker, the combination of a shock supporting platform, means for imparting a step by step rotary movement to said platform, and means for rendering a step in the movement of the platform shorter than normal after a complete rotation of the said platform.

20. In a grain shocker, the combination of a shock supporting platform, a bundle positioner coöperating with said platform, means for rotating said bundle positioner and platform by a step by step movement, and mechanism whereby the length of one of the movements of the bundle positioner and platform is varied with respect to the normal step by step movement to facilitate proper placing of the bundles with respect to said parts.

21. In a grain shocker, the combination of a shock supporting platform, a bundle positioner, a shaft, ratchet wheels carried by said shaft, a gear, means for actuating the gear, pawls carried by the gear and adapted to engage the ratchet wheels, a controlling pawl coöperating with the first mentioned pawls to adjust the same relative to the respective ratchet wheels, whereby a regular intermittent movement may be imparted to the platform and bundle positioner, and means connecting said shaft operatively with the platform and bundle positioner.

22. In a grain shocker, the combination of a shock supporting platform and gear connected therewith, a bundle positioner above said platform, a drive shaft gearing connecting the drive shaft with the gear of the platform, other gearing connecting said shaft with the bundle positioner, shock delivery mechanism operably connected with the drive shaft, means including said gearing for transmitting intermittent movement from the drive shaft to the platform, bundle positioner, carrier and delivery mechanism, and means for imparting a separate independent movement to the bundle positioner to move it out of the way of the delivery mechanism at a predetermined time in the operation of the machine.

23. In a grain shocker, the combination of a rotatable shock supporting platform, a bundle positioner thereon, a receiver, a carrier for transferring a bundle from the receiver to the platform, means for actuating said carrier, means for rotating the bundle positioner and the platform at a predetermined time in the movement of the carrier, delivery mechanism, and means for raising the bundle positioner at a predetermined time in the movement of the delivery mechanism.

In testimony whereof I affix my signature in presence of two witnesses.

CHARLES WARNER LEVINE.

Witnesses:
   CARL ISAACSON,
   G. E. JOHNSON.

Copies of this patent may be obtained for five cents each, by addressing the "Commissioner of Patents, Washington, D. C."